(12) United States Patent
Chiu et al.

(10) Patent No.: US 8,443,296 B2
(45) Date of Patent: May 14, 2013

(54) PROGRESS DISPLAYING SYSTEM AND METHOD THEREOF

(75) Inventors: Chaucer Chiu, Taipei (TW); Frances Dai, Shanghai (CN)

(73) Assignee: Inventec Corporation (TW)

( * ) Notice: Subject to any disclaimer, the term of this patent is extended or adjusted under 35 U.S.C. 154(b) by 210 days.

(21) Appl. No.: 12/928,596

(22) Filed: Dec. 14, 2010

(65) Prior Publication Data

US 2012/0089936 A1    Apr. 12, 2012

(30) Foreign Application Priority Data

Oct. 12, 2010    (TW) .............................. 99134674 A

(51) Int. Cl.
*G06F 3/048*    (2006.01)
*G01P 11/00*    (2006.01)

(52) U.S. Cl.
USPC .......................................... 715/772; 702/149

(58) Field of Classification Search .................... 715/772
See application file for complete search history.

(56) References Cited

U.S. PATENT DOCUMENTS 6,532,432 B1 *    3/2003    Nagatsuma et al. .......... 702/149
2005/0288154 A1 *    12/2005    Lee et al. .......................... 482/3

* cited by examiner

*Primary Examiner* — Kyle Stork
*Assistant Examiner* — Xuyang Xia
(74) *Attorney, Agent, or Firm* — David R. Stevens; Stevens Law Group

(57) ABSTRACT

A progress displaying system and the method thereof are provided. The system and the method thereof are applicable to mileage calculating devices. By generating progress displaying graphs during mileage calculations according to the moving speeds and completed percentages at different time points, and continuously showing progress displaying graphs until the completed percentage is completely fulfilled, the system and the method thereof can achieve the goal of vividly reflecting user's current status during the progress display.

8 Claims, 4 Drawing Sheets

PROGRESS DISPLAYING SYSTEM AND METHOD THEREOF

BACKGROUND OF THE INVENTION

1. Field of Invention

The invention relates to a progress displaying system and the method thereof. In particular, the invention relates to a progress displaying system applicable to mileage calculating devices. According to the moving speeds and completed percentages at different time points, the system plots progress displaying graphs and continuously shows the progress displaying graphs until the full percentage is completed. The method of the same is also disclosed.

2. Related Art

A mileage calculating device is a device that can keep track of the current status of a user after a path is being set. Such mileage calculating devices include pedometers, navigators, treadmills, and so on. Take a pedometer as an example. The user can set the moving distance for a day. While the user is walking, jogging or running, the pedometer can show the current speed in text. Alternatively, it can use a progress bar to indicate the distance that the user has completed. Thus, the user can obtain information of the current status by text or in the progress bar.

However, in the above-mentioned interface, the user's current status is indicated in pure text or the progress bar. Not only monotonous the interface being, such interface apparently cannot satisfy the user's needs for more delicate and multifunctional interfaces today. Besides, since the progress bar can only show the completed distance and cannot integrate other parameters for mileage calculation into a single interface, the user cannot quickly obtain current status of multiple parameters other than a completed percentage.

In summary, the prior art always has the problem that the progress display is not sufficiently direct. It is impossible to reflect multiple current status of the user in one single displaying graph. It is therefore imperative to provide a better solution.

SUMMARY OF THE INVENTION

In view of the foregoing, the invention discloses a progress displaying system applicable to mileage calculating devices and the method thereof.

The disclosed progress displaying system includes: a receiving module for receiving a total distance of a planned trip and for periodically receiving the moving distance within a period of time when the current completed percentage is not full; a computing module for computing the current moving speed after the receiving module receives the moving distance within a period of time and for computing the current completed percentage according to the accumulated moving distance and the total distance of the trip; a graph plotting module for using a sine function to plot a sinusoidal curve according to the current moving speed and the current completed percentage, and using the curve to cut out a region in the coordinate plane of a display interface and fill in the region with a display style to generate a progress displaying graph; and a displaying module for showing the progress displaying graph in the display interface and for showing the current completed percentage in text in the display interface; wherein when the current completed percentage is not full yet, the system continuously receives the moving distance and computes to plot an updated progress displaying graph, and continuously plays the display until the current completed percentage is full.

The disclosed progress displaying method includes the steps of: receiving the total distance of a planned trip; periodically receiving the moving distance within a period of time and computing a current moving speed, and using the accumulated moving distance and the total distance to compute a current completed percentage; using a sine function to plot a curve according to the current moving speed and the current completed percentage, using the curve to cut out a region in the coordinate plane of a display interface and fill in the region with a display style to generate a progress displaying graph; and showing the progress displaying graph in the display interface, and showing the current completed percentage according to a text style in the display interface; wherein when the current completed percentage is not full yet, the system continuously receives the moving distance and computes to plot an updated progress displaying graph, and continuously plays the display until the current completed percentage is full.

The disclosed system and method as described above differ from the prior art in that during the path calculating process, the invention uses the moving speeds and completed percentages at different time points to plot the progress displaying graphs. The progress displaying graphs are continuously played until the completed percentage is full.

Through the above-mentioned technique, the invention achieves the goal of vividly reflecting user's current status during the progress display.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
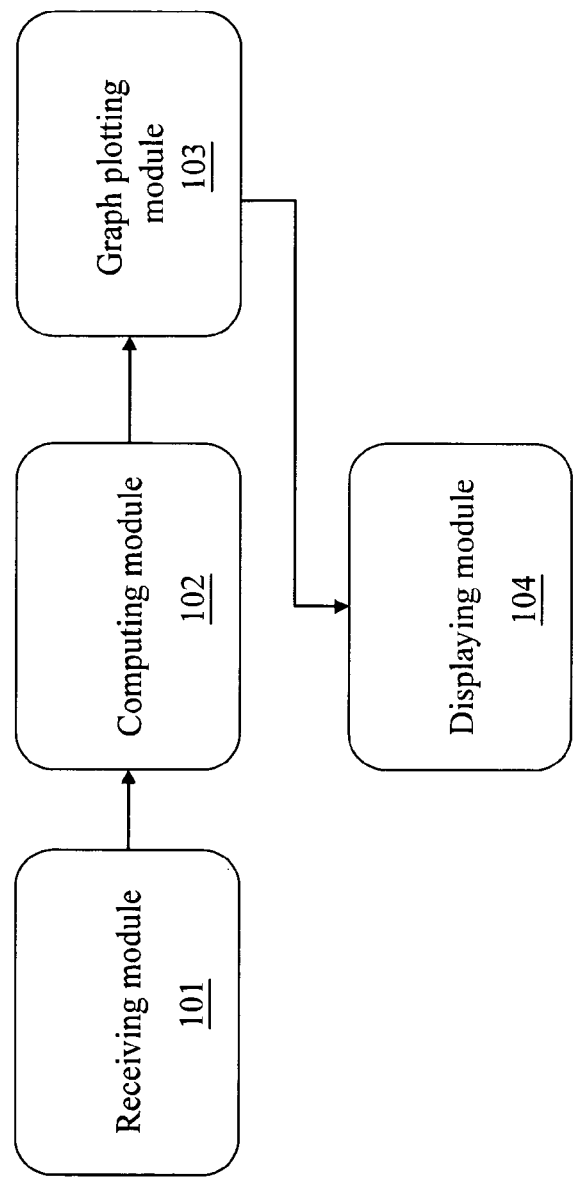
FIG. 1 is a block diagram of the disclosed progress displaying system.

Please refer to FIG. 1. The progress displaying system according to the present invention is applicable to mileage calculating devices. The system includes: a receiving module 101, a computing module 102, a graph plotting module 103, and a displaying module 104. The mileage calculating device referred herein is a device that allows the user to set a path and to detect the current status of the user. Devices such as pedometers, navigators, treadmills, or any other tools that calculate mileages are within the scope of the invention.

The receiving module 101 receives the total distance of a planned trip and periodically receives a moving distance within a period of time when the computed current completed percentage is not full. For example, suppose there is a pedometer. The user sets 3 km on the pedometer as the total distance to run. Before the user completes the 3 km of distance, the receiving module 101 periodically receives the moving distance of the user.

The computing module 102 computes a current moving speed after the receiving module 101 receives the moving distance within a period of time. It further uses the accumulated moving distance and the total distance to compute the current completed percentage. For example, suppose a pedometer user runs 10 meters in 2 seconds. The computing module 102 can calculate and then derive the current moving speed of the user is 5 m/s. Suppose the user has accumulated a moving distance of 25 meters and the total distance is 100 meters. Then the computing module 102 obtains the current completed percentage as 25%.

The graph plotting module 103 uses a sine function to plot a sinusoidal curve according to the current moving speed and the current completed percentage. The curve is then used to cut out a region on the coordinate plane of the display interface. The region is filled in with a display style to generate a progress displaying graph.

The sinusoidal curve can be generated using the following sine function:

$$y=(\text{current amplitude})\times\sin((\text{current period})\cdot x+(\text{phase difference}))+(\text{curve shift}) \quad (a1)$$

where the phase difference is the initial phase of the curve. Since the curve generated by the sine function shifts horizontally with the initial phase, setting different phase differences can filter out different sections of the sinusoidal curve.

In Eq. (a1), the current amplitude can be computed using:

$$\text{Current amplitude} = (\text{minimal amplitude}) + \frac{((\text{current moving speed}) - (\text{minimal speed}))}{((\text{maximal speed}) - (\text{minimal speed}))} \times ((\text{maximal amplitude}) - (\text{minimal amplitude})) \quad (a2)$$

In Eq. (a2), the maximal speed and the minimal speed are the maximum and minimum that the mileage calculating device can accept. For example, suppose the mileage calculating device is a pedometer, and the speed that the mileage calculating device can accept is between 0 and 36 km/hr. In this case, the maximal speed is 36 km/hr, and the minimal speed is 0 km/hr. Since the maximal speed and the minimal speed can be set according to different needs, the invention does not impose any restriction on the actual values of them.

Besides, the maximal amplitude and the minimal amplitude in Eq. (a2) are the maximum and minimum of the amplitude in a default amplitude interval. For example, suppose the amplitude interval is between 0.5 and 4 units. Then the maximal amplitude is 4 units, and the minimal amplitude is 0.5 units. Here 'unit' is used because the plotting process may involve different units and the unit also changes with the coordinate plane of the display interface. The invention does not impose any restriction on the actual units of the amplitude. For example, suppose the coordinate plane of the display interface uses pixels (px), then the unit is px. If the coordinate plane of the display interface is in units of mm, then the unit is mm. Besides, since the amplitude interval can be preset according to the display needs according to the sinusoidal curve without affecting the calculation of the current amplitude, the invention does not impose any restriction on the numerical range of the amplitude interval.

It should also be noted that the current period of Eq. (a1)) is determined according to:

$$\text{Current period}=(\text{minimal period})+(\text{current completed percentage})\times((\text{maximal period})-(\text{minimal period})) \quad (a3)$$

The maximal period and the minimal period in Eq. (a3) are the maximum and minimum of the period in a default period interval. Likewise, the default period interval is preset according to the display needs of the sinusoidal curve. Therefore, the invention also does not impose any constraint on the numerical range of the period interval.

Please refer to Eq. (a1)) again. The curve shift therein is determined by:

$$\text{Curve shift}=(\text{current amplitude})+(\text{current completed percentage})\times(\text{maximal display height}) \quad (a4)$$

In Eq. (a4), the maximal display height is the maximal shift displayable in the coordinate plane of the display interface. For example, suppose the display interface is (50 unit)-squared, then the coordinates range from (0,0) to (50,50). The maximal display height is 50 units. Since the maximal display height is preset according to the size of the display interface and display needs, the invention does not impose any restriction on the numerical range of the maximal display height.

Using Eqs. (a1) to (a4), the graph plotting module 103 can generate a sinusoidal curve. After generating the sinusoidal curve, the graph plotting module 103 uses the sinusoidal curve to cut out a region in the coordinate plane of the display interface. The region is filled in with a display style. The progress displaying graph is thus generated. The display style can be a single color, a filling pattern, or a file with figures. The display style is not restricted by the invention.

After the graph plotting module 103 completes plotting the progress displaying graph, the displaying module 104 shows the progress displaying graph. At the same time, the displaying module 104 also shows the current completed percentage in the display interface using a text style. The text style can be font, font size, or font color, which is not restricted by the invention. Since the displaying module 104 shows the progress displaying graph as well as the current completed percentage according to the text style, the user can read the current moving speed and the completed percentage from the same progress displaying graph. Moreover, the display interface of progress can be more vivid to enhance the displaying effect.

In addition to filling colors in the region cut out by the sinusoidal curve, the graph plotting module 103 can further plot a random pattern (e.g., bubble, waterweed, fish, etc) in the progress displaying graph according to the current moving speed. When the displaying module 104 continuously plays the progress displaying graph, graphs of a shaking liquid are produced. The extent of liquid shaking varies with the current moving speed and the completed percentage. At the same time, the liquid can have a random pattern to vary with the current moving speed. For example, the bubbles appear faster, the waterweeds wiggle faster, or the fish swims back and forth faster.

Figure 2:
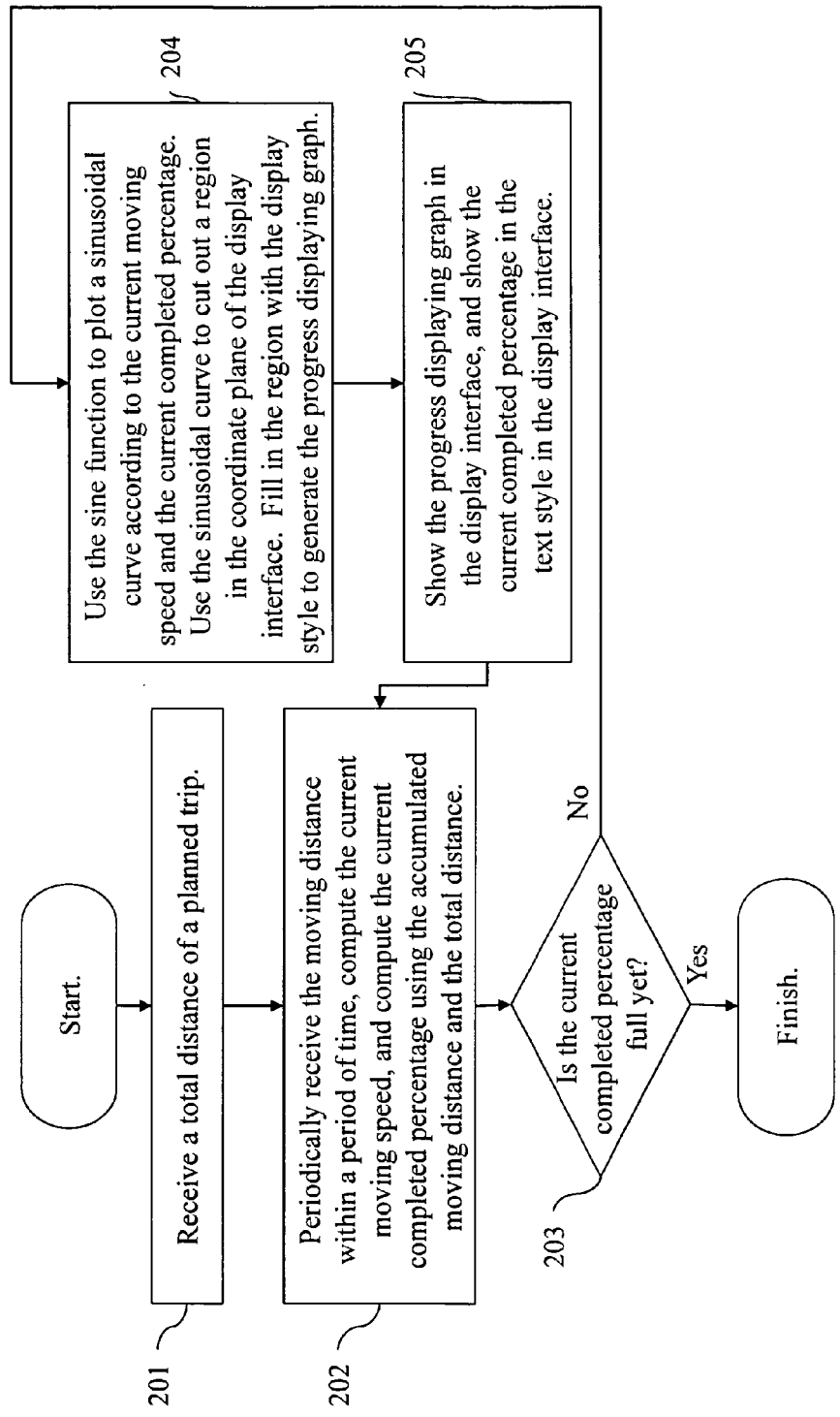
FIG. 2 is a flowchart of the disclosed progress displaying method.

Please refer to FIG. 2 for a flowchart of the disclosed progress displaying method. The progress displaying method is applicable to mileage calculating devices, such as pedometers, navigators, treadmills, etc.

The method starts by receiving the total distance of a planned path (step 201). Afterwards, it periodically receives the moving distance within a period of time and computes the current moving speed. The accumulated moving distance and the total distance of the path are used to compute the current completed percentage (step 202). After obtaining the current moving speed and the current completed percentage, the method then determines whether the current completed percentage is full (step 203). When the current completed percentage is not full yet, the sine function is used to plot a sinusoidal curve according to the current moving speed and the current completed percentage. The curve is then used to cut out a region on the coordinate plane of the display interface, and the region is filled in with a display style to generate a progress displaying graph (step 204).

It should be noted that the sinusoidal curve is generated by a sine function. The generation of the sinusoidal curve has been described before and is not repeated here.

After generating the progress displaying graph, the display interface shows the progress displaying graph and the current completed percentage according to a text style (step 205). The text style can be font, font size, or font color, which is not restricted by the invention.

In addition to filling colors in the region cut out by the sinusoidal curve, the plotted progress displaying graph can include a random pattern (e.g., bubble, waterweed, fish, etc) in the progress displaying graph according to the current moving speed. When the progress displaying graphs are continuously played, graphs of a shaking liquid are produced. The extent of liquid shaking varies with the current moving speed and the completed percentage. At the same time, the liquid can have a random pattern to vary with the current moving speed. For example, the bubbles appear faster, the waterweeds wiggle faster, or the fish swims back and forth faster.

In the following, a mileage calculating process on a pedometer is used as an embodiment to explain how the invention is implemented.

First, the pedometer receives the total distance of a planned path. Suppose the user sets the total distance as 2000 m on the pedometer, and the user moves a distance of 3 m in one second. Then the pedometer computes to get the current moving speed of the user as 3 m/s. Suppose the user has accumulated a moving distance of 900 m. Then the pedometer computes to get the completed percentage as 45%.

After the pedometer calculates the current moving speed and the completed percentage. A sinusoidal curve is generated according to the following sine function:

$$y=(\text{current amplitude})\times\sin((\text{current period})\cdot x+(\text{phase difference}))+(\text{curve shift}) \quad (b1)$$

where the phase difference is the initial phase of the curve. Since the curve generated by the sine function shifts horizontally with the initial phase, setting different phase differences can filter out different sections of the sinusoidal curve.

Moreover, the current amplitude, the current period, and the curve shift in Eq. (b1) can be determined using the following equations:

$$\text{Current amplitude} = (\text{minimal amplitude}) + \frac{((\text{current moving speed}) - (\text{minimal speed}))}{((\text{maximal speed}) - (\text{minimal speed}))} \times ((\text{maximal amplitude}) - (\text{minimal amplitude})) \quad (b2)$$

$$\text{Current period} = (\text{minimal period}) + (\text{current completed percentage}) \times ((\text{maximal period}) - (\text{minimal period})) \quad (b3)$$

$$\text{Curve shift} = (\text{current amplitude}) + (\text{current completed percentage}) \times (\text{maximal display height}) \quad (b4)$$

Suppose the pedometer is set to accept the maximal speed 35 m/s and the minimal speed 0 m/s. The default amplitude interval has the maximal amplitude of 4 and the minimal amplitude of 0.5. Then according to the current moving speed of 3 m/s and the current completed percentage of 45%, the current amplitude according to Eq. (b2) is 0.8. Moreover, Eq. (3) can be used to obtain the current period as 2.525.

Figure 3:
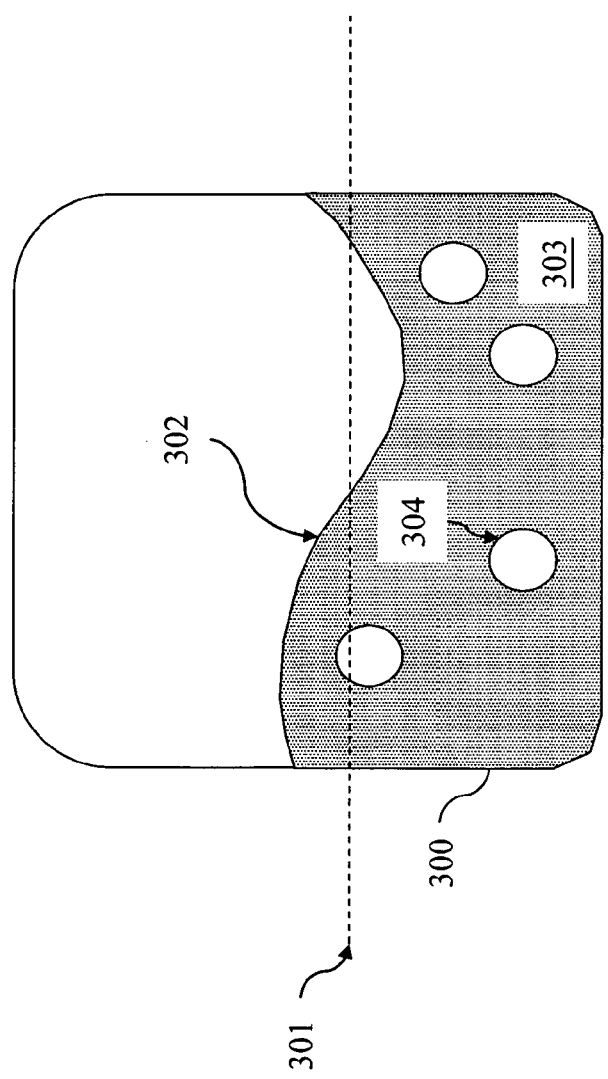
FIG. 3 is a schematic view of the progress displaying graph according to an embodiment of the invention.

Please refer to FIG. 3. Suppose the coordinate plane 300 of the display interface is roughly a square. The curve shift according to Eq. (b4) is as indicated by the dashed line 301. Then the current amplitude 0.8 and the current period 2.525 are inserted into Eq. (b1) to obtain roughly the sinusoidal curve 302. Afterwards, the graph plotting module of the pedometer fills the region below the sinusoidal curve 302 according to the display style, rendering a filling region 303. The progress displaying graph composed of the sinusoidal curve 302 and the filling region 303 presents a graph similar to a liquid in a container. The display style can be a single color, a filling pattern, or a figure file, which is not restricted herein. Besides, the method can generate a random pattern 304 in the filling region 303 so that the progress displaying graph presents a bubble-like effect in the liquid, resulting a more vivid and intuitive screen.

Figure 4:
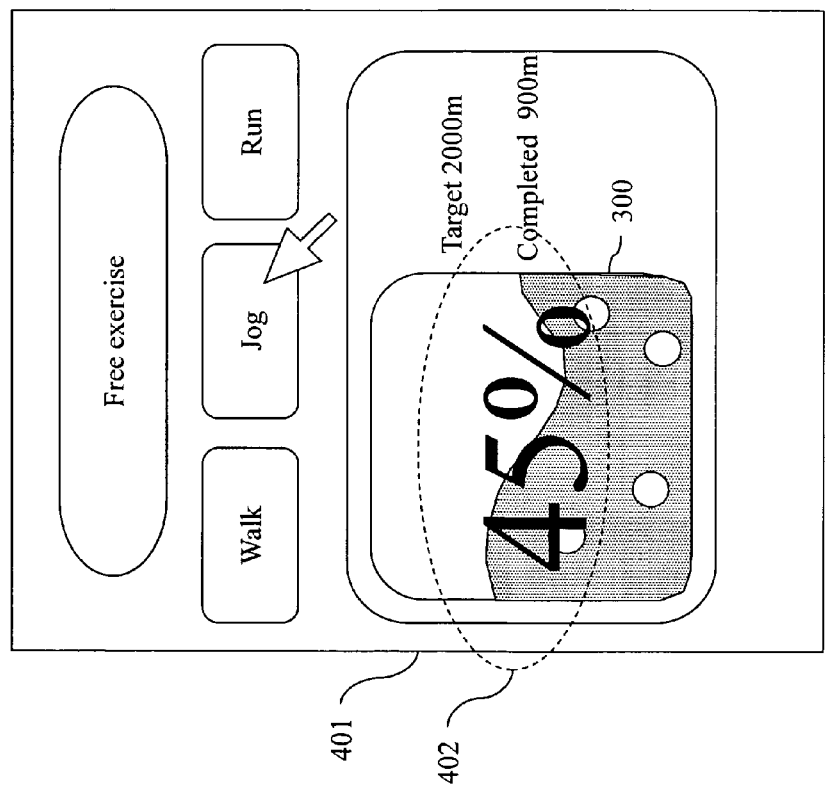
FIG. 4 is a schematic view of the display interface according to an embodiment of the invention.

Please refer to FIG. 4. Once the progress displaying graph is made, the displaying module of the pedometer shows the progress displaying graph in the display interface 401. The current completed percentage 402 is concurrently shown according to the text style. Before the completed percentage reaches 100%, the pedometer continues to plot the progress displaying graph and updates the display. For different current moving speeds of the user during the process of counting steps, the method shows different extents of a shaking liquid and frequencies of surfacing bubbles. Different liquid heights are shown for different current completed percentages. The user can therefore know the current status in a quicker and more intuitive way.

In summary, the invention differs from the prior art in that during the path calculating process, the invention uses the moving speeds and completed percentages at different time points to plot the progress displaying graphs. The progress displaying graphs are continuously played until the completed percentage is full. Through the above-mentioned technique, the invention achieves the goal of vividly reflecting user's current status during the progress display.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A progress displaying system on a hardware mileage calculating device, the progress displaying system comprising:
   a receiving module for receiving a total distance of a planned trip and for periodically receiving the moving distance within a period of time when the current completed percentage is not full;
   a computing module for computing the current moving speed after the receiving module receives the moving distance within a period of time and for computing the current completed percentage according to the accumulated moving distance and the total distance of the trip;
   a graph plotting module for using a sine function $$y=(\text{current amplitude})\times\sin((\text{current period})\cdot x+(\text{phase difference}))+(\text{curve shift})$$

to plot a sinusoidal curve according to the current moving speed and the current completed percentage, and using the curve to cut out a region in the coordinate plane of a display interface and fill in the region with a display style to generate a progress displaying graph, wherein the phase different is the initial phase to plot the sinusoidal curve; and a displaying module for showing the progress displaying graph in the display interface and for showing the current completed percentage in text in the display interface;

wherein when the current completed percentage is not full yet, the system continuously receives the moving distance and computes to plot an updated progress displaying graph, and continuously plays the display until the current completed percentage is full.

2. The progress displaying system of claim 1, wherein the current amplitude is computed according to:

$$\text{Current amplitude} = (\text{minimal amplitude}) + \frac{((\text{current moving speed}) - (\text{minimal speed}))}{((\text{maximal speed}) - (\text{minimal speed}))} \times ((\text{maximal amplitude}) - (\text{minimal amplitude}))$$

wherein the maximal speed and the minimal speed are the maximum and the minimum of the speed acceptable by the mileage calculating device, and the maximal amplitude and the minimal amplitude are respectively the maximum and minimum of the amplitude in a default amplitude interval.

3. The progress displaying system of claim 1, wherein the current period is obtained using:

Current period=(minimal period)+(current completed percentage)×(maximal period)−minimal period))

wherein the maximal period and the minimal period are respectively the maximum and minimum of the period in a default period interval.

4. The progress displaying system of claim 1, wherein the curve shift is obtained using:

Curve shift=(current amplitude)+(current completed percentage)×(maximal display height)

wherein the maximal display height is the default maximal shift displayable in the coordinate plane of the display interface.

5. A progress displaying method for a mileage calculating device, the progress displaying method comprising the steps of:

receiving a total distance of planned trip;

periodically receiving a moving distance within a period of time, computing a current moving speed, and computing a current completed percentage according to the accumulated moving distance and the total distance;

using a sine function $y=(\text{current amplitude}) \times \sin((\text{current period}), x+(\text{phase difference})) + (\text{curve shift})$ to plot a sinusoidal curve according to the current moving speed and the current completed percentage, wherein the phase different is the initial phase to plot the sinusoidal curve;

using the sinusoidal curve to cut out a region in a coordinate plane of a display interface and fill in the region with a display style to generate a progress displaying graph; and displaying the progress displaying graph in the display interface and concurrently showing the current completed percentage in the display interface in a text style;

wherein when the current completed percentage is not full yet, the system continuously receives the moving distance and computes to plot an updated progress displaying graph, and continuously plays the display until the current completed percentage is full.

6. The progress displaying method of claim 5, wherein the current amplitude is computed according to:

$$\text{Current amplitude} = (\text{minimal amplitude}) + \frac{((\text{current moving speed}) - (\text{minimal speed}))}{((\text{maximal speed}) - (\text{minimal speed}))} \times ((\text{maximal amplitude}) - (\text{minimal amplitude}))$$

wherein the maximal speed and the minimal speed are the maximum and the minimum of the speed acceptable by the mileage calculating device, and the maximal amplitude and the minimal amplitude are respectively the maximum and minimum of the amplitude in a default amplitude interval.

7. The progress displaying method of claim 5, wherein the current period is
obtained using:

Current period=(minimal period)+(current completed percentage)×((maximal period)−(minimal period))

wherein the maximal period and the minimal period are respectively the maximum and minimum of the period in a default period interval.

8. The progress displaying method of claim 5, wherein the curve shift is obtained using:

Curve shift=(current amplitude)+(current completed percentage)×(maximal display height)

wherein the maximal display height is the default maximal shift displayable in the coordinate plane of the display interface.

* * * * *